United States Patent
Herbertson et al.

(10) Patent No.: US 11,110,421 B2
(45) Date of Patent: Sep. 7, 2021

(54) PROCESSING QUARANTINED MATERIALS

(71) Applicant: The Crucible Group IP Pty Ltd, Paddington (AU)

(72) Inventors: Joseph George Herbertson, Mayfield (AU); Lazar Strezov, Adamstown Heights (AU); Kannappar Mukunthan, Garden Suburb (AU)

(73) Assignee: The Crucible Group IP Pty Ltd, Paddington (AU)

( * ) Notice: Subject to any disclaimer, the term of this patent is extended or adjusted under 35 U.S.C. 154(b) by 0 days.

(21) Appl. No.: 16/329,798

(22) PCT Filed: Sep. 1, 2017

(86) PCT No.: PCT/AU2017/050944
§ 371 (c)(1),
(2) Date: Mar. 1, 2019

(87) PCT Pub. No.: WO2018/039737
PCT Pub. Date: Mar. 8, 2018

(65) Prior Publication Data
US 2019/0240633 A1    Aug. 8, 2019

(30) Foreign Application Priority Data
Sep. 1, 2016   (AU) ................................. 2016903494

(51) Int. Cl.
*B01J 6/00* (2006.01)
*B01J 4/00* (2006.01)
(Continued)

(52) U.S. Cl.
CPC ............... *B01J 6/008* (2013.01); *B01J 4/008* (2013.01); *B01J 6/004* (2013.01); *B09B 3/00* (2013.01);
(Continued)

(58) Field of Classification Search
None
See application file for complete search history.

(56) References Cited

U.S. PATENT DOCUMENTS 714,451 A      11/1902  Miller et al.
2011/0048918 A1  3/2011  Streszov et al.
(Continued)

FOREIGN PATENT DOCUMENTS

WO   2009124359      10/2009
WO   2015061833       5/2015
WO   WO-2015061833 A1 *  5/2015  ............... C10B 7/10

OTHER PUBLICATIONS

International Search Report for Application No. PCT/AU2017/050944 dated Nov. 17, 2017 (3 pages).

*Primary Examiner* — Philip Y Louie
(74) *Attorney, Agent, or Firm* — Michael Best & Friedrich LLP

(57) ABSTRACT

A method and an apparatus for destroying biosecurity hazards in quarantined feed materials and producing valuable products that are safe and have economic value is disclosed. The apparatus includes a continuous converter (3) that has a reaction chamber (5) for producing a solid carbon-containing product, a gas product, and optionally an oil product and a separate water-based condensate product in the chamber, via pyrolysis or other reaction mechanisms.

16 Claims, 10 Drawing Sheets

(51) Int. Cl.
  *B09B 3/00* (2006.01)
  *C10B 49/04* (2006.01)
  *C10B 53/02* (2006.01)
  *C10B 57/10* (2006.01)
  *C10C 5/00* (2006.01)
  *C10B 7/10* (2006.01)

(52) U.S. Cl.
  CPC .............. *B09B 3/0083* (2013.01); *C10B 7/10* (2013.01); *C10B 49/04* (2013.01); *C10B 53/02* (2013.01); *C10B 57/10* (2013.01); *C10C 5/00* (2013.01); *B01J 2208/00769* (2013.01); *Y02E 50/10* (2013.01); *Y02P 20/145* (2015.11)

(56) References Cited

U.S. PATENT DOCUMENTS

| | | | |
|---|---|---|---|
| 2012/0266530 A1* | 10/2012 | Ellis | ................ C10L 5/363 44/500 |
| 2013/0263501 A1* | 10/2013 | Monroe | ................ C10L 9/083 47/1.4 |
| 2015/0144831 A1 | 5/2015 | Mennell et al. | |
| 2016/0244674 A1 | 8/2016 | Streszov et al. | |

* cited by examiner

PROCESSING QUARANTINED MATERIALS

TECHNICAL FIELD

The present invention relates to a method of destroying biosecurity hazards in quarantined materials and producing safe products that have economic value.

BACKGROUND ART

Biosecurity at borders between countries is an increasingly important consideration for Governments.

One aspect of biosecurity is the disposal of food, plant material and animal material that carry or contain potential biosecurity hazards.

The food, plant material and animal material may be handed over to or seized by Customs Departments on entry into countries as part of the standard operations of Customs Departments and subsequently destroyed by or on behalf of those Departments.

The food, plant material and animal material may be brought into countries by airlines, shipping, trains and buses and quarantined on entry into countries by the transport operators and subsequently destroyed by or on behalf of those transport operators. For example, the food, plant material and animal material may part of catering waste from international flights.

These cross-national border food, plant material, wood and animal products are hereinafter referred to as "quarantined materials".

The biosecurity hazards include any unwanted biological material—virus, bacteria, higher organisms such as fungi, plants and animals, by way of example, pathogens in animal material (including animal waste) and invasive species in food, plant material and animal material.

There is a need for alternative options for destroying biosecurity hazards in quarantined materials than the currently-available options.

The above description is not to be taken as an admission of the common general knowledge in Australia and elsewhere.

SUMMARY OF THE DISCLOSURE

The applicant has developed a method and an apparatus for converting biomass or other solid organic feed materials via pyrolysis or other mechanisms to valuable products such as but not confined to any one or more of a liquid water product (which can be described in general terms as a water-based condensate and in some instances as "wood vinegar"), a liquid oil product, a gas product, and a solid carbon-containing product such as a char product.

The method and the apparatus are hereinafter referred to collectively as the "continuous biomass converter" technology.

The term "biomass" is understood herein to mean living or recently living organic matter. Specific biomass products include, by way of example, forestry products (including mill residues such as wood shavings), agricultural products, biomass produced in aquatic environments such as algae, agricultural residues such as straw, olive pits and nut shells, animal wastes, municipal and industrial residues.

The term "organic feed materials" includes biomass, peat, coal, oil shales/sands, plastic waste materials, and also includes blends of these feed materials.

The above-mentioned continuous biomass converter technology is described and claimed in patent families that include International applications PCT/AU2009/000455 (WO2009/124359) and PCT/AU2014/001020 (WO2015/061833) in the name of the applicant. The disclosure in the patent specifications of these patent applications is incorporated herein by cross-reference.

The continuous biomass converter technology of the applicant combines the functions of drying, char making, tar cracking and gas scrubbing into a single stage, continuous and automatically controlled reactor operating under quite unique thermo-chemical conditions. The continuous biomass converter technology makes it possible to achieve high energy efficiencies and streamlined engineering, which has considerable advantages when compared to available pyrolysis and gasification options.

The applicant has identified operating conditions that make the continuous biomass converter technology particularly effective for destroying biosecurity hazards in quarantined materials and producing valuable products that are safe and have economic value.

In particular, the applicant has found in research and development work on quarantined materials provided by an airline that biosecurity hazards of concern (such as any unwanted biological material—virus, bacteria, higher organisms such as fungi, plants and animals) cannot survive the continuous biomass converter technology of the applicant.

In broad terms, in accordance with the present invention, feed material comprising quarantined materials and additional biomass as part of a feed material is supplied to an apparatus in the form of a continuous converter and moved through a reaction chamber of the converter, typically in a packed bed form, more particularly a closely packed bed form, and exposed to a time-temperature profile within the chamber that destroys biosecurity hazards in the quarantined materials and dries and pyrolyses or otherwise processes by another reaction mechanism the feed material and produces a solid carbon-containing product (such as a char product) and releases water vapour and a volatile products gas phase.

Typically, the converter is positioned so that the reaction chamber is horizontally disposed. It is noted that the converter, and more particularly the chamber, may be slightly inclined or vertical.

The water vapour and volatile products gas phase move counter-current to the feed material in the chamber. At least a part of the condensable components of the volatile products in the gas phase condense in cooler upstream sections of the chamber and form liquid oil (i.e. a liquid oil-based condensate) and tar. Typically, the operating temperatures are such that water vapour does not condense in the chamber and discharges from the chamber as part of the gas phase and condenses as liquid water product outside the chamber.

The condensed liquid oil and tars are carried forward in the reaction chamber by the feed material to the higher temperature regions of the chamber and are progressively volatilised and cracked to hydrogen, carbon monoxide, carbon dioxide and short chain hydrocarbons such as methane, ethane, and other light hydrocarbons. The end result of the condensation and volatilisation cycle is that a gas product comprising water vapour and non-condensable gases at the temperature and pressure within the chamber is discharged from the chamber.

There may be circumstances where it is desirable to drain a part of the liquid oil from the chamber as a separate product.

The gas product may include water vapour, CO, $H_2$, $CO_2$, $N_2$, methane, ethane and other light hydrocarbons. The other product from the chamber is a solid carbon-containing product (such as char) that is discharged from a downstream outlet in the chamber.

The gas generated from the quarantined materials is clean burning with respect to potentially harmful organic substances, due to internal cracking and thermal decomposition of long chain, complex molecules in the reaction chamber of the converter. The gas exits the continuous biomass converter at very low temperatures compared to typical thermal processes (well below 100° C.), after flowing through the packed bed of input feed material moving counter currently (these are distinctive features of the continuous biomass converter technology). Consequently, there is gas scrubbing as the gas moves towards the cold end of the reaction chamber and minimal opportunity for metal transfer from the feed material to the gas.

The continuous biomass converter technology operates under reducing conditions (not combustion or incineration).

Whilst the continuous biomass converter technology incorporates pyrolysis reactions, it is more than a pyrolyser, since it includes drying, tar cracking, and gas scrubbing within the reactor. In other pyrolysis systems, these functions typically take place in separate unit operations, under different conditions to those prevailing in the continuous biomass converter technology.

The features of the continuous biomass converter technology that the applicant has identified as being important in for the destruction of biosecurity hazards include the following features:

1. The continuous biomass converter technology is a sealed system and therefore biosecurity hazards are completely contained during processing in the apparatus.

2. The feed inlet to the reaction chamber of the apparatus is maintained at a small negative pressure, ~50 Pa, as an additional protection against gas escaping from the apparatus.

3. The time-temperature profile within the reaction chamber of the converter, typically 200-600° C. over a period of 5-20 minutes, typically 7-15 minutes, is controlled to destroy biosecurity hazards.

4. The thermo-chemical conditions in the reaction chamber of the converter are controlled to be reducing to ensure high carbonisation of the char product.

5. The gas product discharged from the reaction chamber of the converter is combusted to produce heat or generate power. This combustion eliminates any possibility of gas-borne biosecurity hazards.

6. The pH of the water product discharged from the reaction chamber of the converter, which may be condensed from the gas product or may be produced as a separate product of the reaction chamber, is less than 3, typically 2-3, which assists in destroying any biosecurity hazards in the water product.

7. The process conditions, such as gas exit temperatures (typically controlled to be less than 100° C. at the outlet, typically less than 90° C., typically of the order of 80° C.) ensures that metals potentially present in the quarantined feed materials are retained predominantly with char product and not present as vapour in the gas phase and transported to the gas and the liquid product.

In broad terms, the present invention provides an apparatus for destroying biosecurity hazards in quarantined feed materials and producing valuable products that are safe and have economic value, the apparatus including a continuous converter for a feed material including quarantined materials and additional biomass, with the continuous converter including a reaction chamber for producing a solid carbon-containing product, a gas product, and optionally an oil product and a separate water-based condensate product in the chamber, via pyrolysis or other reaction mechanisms, an inlet for supplying the feed material to the reaction chamber, an assembly for moving the feed material through the reaction chamber from the upstream end towards the downstream end of the chamber counter-current to the flow of gas generated in the chamber as a consequence of drying or other reactions in the chamber, and separate outlets for the solid carbon-containing product, the gas product, and optionally the oil product and the water-based condensate product from the reaction chamber.

In broad terms, the present invention also provides a method for destroying biosecurity hazards in quarantined materials and producing valuable products that are safe and have economic value in the apparatus described in the preceding paragraph, with the method including the steps of:

(a) supplying a feed material including the quarantined materials and additional biomass to the inlet of the reaction chamber of the apparatus;

(b) moving the feed material through the reaction chamber from the inlet to the downstream end of the chamber and exposing the feed material to a time-temperature profile within the chamber that destroys biosecurity hazards in the quarantined materials and dries and pyrolyses or otherwise processes organic material in the feed material and releases water vapour and a volatile products gas phase from the feed material as the feed material moves through the chamber;

(c) moving the water vapour phase and the volatile products gas phase produced by heating the feed material in step (b) through the reaction chamber in a direction counter to that of the feed material so that at least a part of the water vapour phase and the condensable components of the volatile products gas phase condense in cooler upstream sections of the reaction chamber and form liquid water and liquid oil, at least the liquid oil being carried forward in the reaction chamber by the feed material to the higher temperature regions of the reaction chamber and being progressively volatilised and cracked to a non-condensable gas; and (d) discharging (i) a gas product and (ii) a dried and pyrolysed solid carbon-containing product from the separate outlets of the chamber.

The quarantined materials may be as described above. Specifically, quarantined materials may include cross-national border food, plant material, wood, and animal material. The food, plant material, wood, and animal material may be brought into countries by airlines, shipping, trains and buses and quarantined on entry into countries by the transport operators and subsequently destroyed by or on behalf of those transport operators. For example, the food, plant material and animal material may part of catering waste from international flights and include paper/plastic trays, cups and utensils, paper napkins, and food scraps.

The as-received quarantined materials may be processed as required to be minus 25 mm, typically less than minus 20 mm in size in the feed material.

The additional biomass may be any suitable biomass having regard to the process requirements for destroying the biosecurity hazards in the quarantined materials.

In some situations, the additional biomass is required to provide the packed bed of feed material with a structure that maintains the required characteristics of the packed bed as it moves through the reaction chamber of the converter. By way of example, the structure may be to provide the packed bed with sufficient porosity for gas flow counter-current to the direction of movement of the moving bed of feed material through the reaction chamber. The structure may be to ensure that the quarantined materials and the additional biomass maintain a uniform blend of these components in situations where this is desirable.

The additional biomass may be wood, for example wood waste, in a particulate form.

The additional biomass may be in a particulate form having a particle size of minus 25 mm, typically minus 20 mm.

The feed material may include less than 15 wt. %, typically less than 10 wt. %, of the total mass of feed material having a particle size of minus 1 mm. This is regarded as a fines component of the feed material.

Typically, the amount of moisture in the feed material is less than 20 wt. %, more typically less than 15 wt. %, of the total mass of the feed material.

The relative amounts of the quarantined materials and the additional biomass in the feed material may be selected as required having regard to the process requirements for destroying the biosecurity hazards in the quarantined material.

Typically, the components, including composition and form, of the quarantined materials have an impact on the relative amounts of the quarantined materials and the additional biomass and on the characteristics, such as structural properties and composition, of the additional biomass required for use with the quarantined materials.

Typically, the quarantined materials may be up to 50 wt. %, typically up to 35 wt. %, of the total mass of the quarantined materials and the additional biomass. It is noted that there may also be situations where there are higher amounts of quarantined materials in relative terms.

The quarantined materials and the additional biomass may be supplied separately at required respective feed rates to the inlet end of the reaction chamber of the converter and mix together when forming the packed bed at the inlet end of the reaction chamber.

The quarantined materials and the additional biomass may be mixed together and then supplied to the inlet end of the reaction chamber as a blend.

Typically, the gas product includes water vapour and non-condensable gases including carbon monoxide, carbon dioxide, hydrogen, and hydrocarbons (particularly methane).

The method may include controlling gas product composition having regard to end-use requirements for the gas product.

The gas product may contain varying amounts of hydrogen and methane. There may be situations in which higher concentrations of hydrogen and lower concentrations of methane are preferred. There may be other situations, for example when the gas product is used for electricity generation in an internal combustion engine, where higher concentrations of methane and lower concentrations of hydrogen are preferred.

The method may include controlling the gas product composition by controlling the temperature profile in the reactor and therefore the residence time within a required temperature range.

As described above, the method may be operated so that water is discharged as water vapour only and there is no liquid water discharged from the chamber. Consequently, the only "products" discharged from the chamber are a gas product and a solid carbon-containing product. The gas product may include water vapour, CO, $H_2$, $CO_2$, $N_2$, methane, ethane and other light hydrocarbons.

The method may include condensing water vapour from the gas product outside the chamber and forming a liquid water product. The remaining gas product may be used as a fuel gas.

However, it is also noted that the method may include forming a liquid water product within the chamber and discharging the product from the chamber.

The method may be operated at a small negative pressure relative to atmospheric pressure at the upstream feed material end of the reaction chamber to prevent or minimise the risk of gas leakage from the reaction chamber.

The method may include supplying water to the downstream end of the reaction chamber to control solid carbon-containing product characteristics such as moisture content. For example, higher moisture contents may be desirable for solid carbon-containing products for agricultural use. Lower moisture contents may be suitable for industrial applications, such as char (e.g. for metallurgy and power generation) where water needs to be limited). Adding water helps to overcome problems associated with potentially pyrohorric char (spontaneous combustion).

The temperature profile in the reaction chamber is an important consideration for destroying biosecurity hazards in quarantined feed materials. Operating with a required temperature profile requires selecting appropriate operating conditions, including feed rate along the length of the reaction chamber and air injection rate into the chamber, having regard to the composition and physical characteristics of the feed materials and the need for balancing internal heating, process heat and heat losses.

Typically, the required temperature profile is an extended temperature gradient in a countercurrent solids/gas reactor. The term "extended" in this context means that sufficient time is allowed for the required reactions to occur in the reaction chamber to ensure destruction of biosecurity hazards in quarantined feed materials. As is discussed further below, the applicant has realised that appropriate processing of feed materials requires the material to move through three zones involving drying, heating and thermo-chemical reactions and it is necessary to allow sufficient time for these process steps to be achieved.

The method may include maintaining a required temperature profile in the reaction chamber by supplying an oxygen-containing gas, such as air, to the reaction chamber and at least partially combusting combustible gases in the reaction chamber. The combustible gases may be generated by pyrolysis of organic material in the reaction chamber.

The temperature profile in the reaction chamber may include a plurality of zones successively along the length of the chamber in which different reactions occur as the feed material moves from the upstream cooler end to the downstream hotter end of the reaction chamber.

As noted above, a key consideration is to provide sufficient time for the different reactions required to destroy biosecurity hazards in quarantined feed materials and to breakdown other components, such as organics including plastics that may be in the feed material and to produce safe and valuable products.

The continuous converter may include an assembly for establishing a temperature profile in the reaction chamber that includes the following zones extending successively along the length of the reaction chamber from the upstream end to the downstream end of the reaction chamber:

(a) a drying zone (Zone 1) for drying the feed material—typically 60-80° C. is the inlet end temperature and 100-150° C. is the upper temperature limit of Zone 1, (b) a pre-heating zone (Zone 2) for heating the feed material to a temperature that is suitable for the thermo-chemical reactions required in the next zone—typically 250-300° C. is the upper limit of Zone 2, and (c) a thermo-chemical reaction zone (Zone 3) for thermally decomposing the feed material and producing a solid carbon-containing, typically char product, and gas.

Thermal decomposition of the feed material in Zone 3 devolatilises the feed material and generates gas. The gas includes some combustible gas and this combustible gas combusts in Zone 3 and generates heat within the zone. Typically, 600-650° C. is the upper limit of Zone 3.

The applicant has found that the thermal decomposition reactions are predominantly endothermic and the combustion of some of the combustible gas released from the feed material is important to maintain reaction temperatures in Zone 3.

The gas generated in Zone 3 inevitably moves from the hotter downstream end to the colder upstream end of the chamber because the downstream end has a gas seal and there is a gas outlet in the upstream end of the chamber. There is convective heat transfer to the feed material in Zones 1 and 2 from the comparatively hot gas moving from Zone 3 towards the colder upstream end of the reactor counter-current to the direction of movement of the feed material successively through the zones.

The method may include supplying the oxygen-containing gas, such as air, to the reaction chamber in Zone 3, whereby the devolatilization produces combustible gases that are combusted by the oxygen-containing gas. Supplying the oxygen-containing gas in this region of the reaction chamber optimises the combustion of combustible gases to where it is most beneficial.

The oxygen-containing gas may be oxygen, air, or oxygen-enriched air.

In broad terms, the present invention also provides an apparatus for processing quarantined material and destroying biosecurity hazards in the quarantined material and producing valuable products, with the apparatus including the apparatus described above.

In broad terms, the present invention also provides a method for processing quarantined material and destroying biosecurity hazards in the quarantined material and producing valuable products including the steps of:

(a) size reduction, such as shredding, a quarantined material;

(b) reducing the water content in the quarantine material to a predetermined content; and (c) processing the quarantine material in the above-described method for destroying biosecurity hazards in quarantined materials and producing valuable products Step (b) of reducing the water content of the size-reduced quarantine material may include de-watering (where this term is understood to include beverages) the shredded quarantine material.

Step (b) of reducing the water content of the size-reduced quarantine material may include a drying step after the de-watering step.

BRIEF DESCRIPTION OF THE DRAWINGS

The present invention is described further by way of example only with reference to the accompanying drawings, of which.

DESCRIPTION OF EMBODIMENTS

Figure 1:
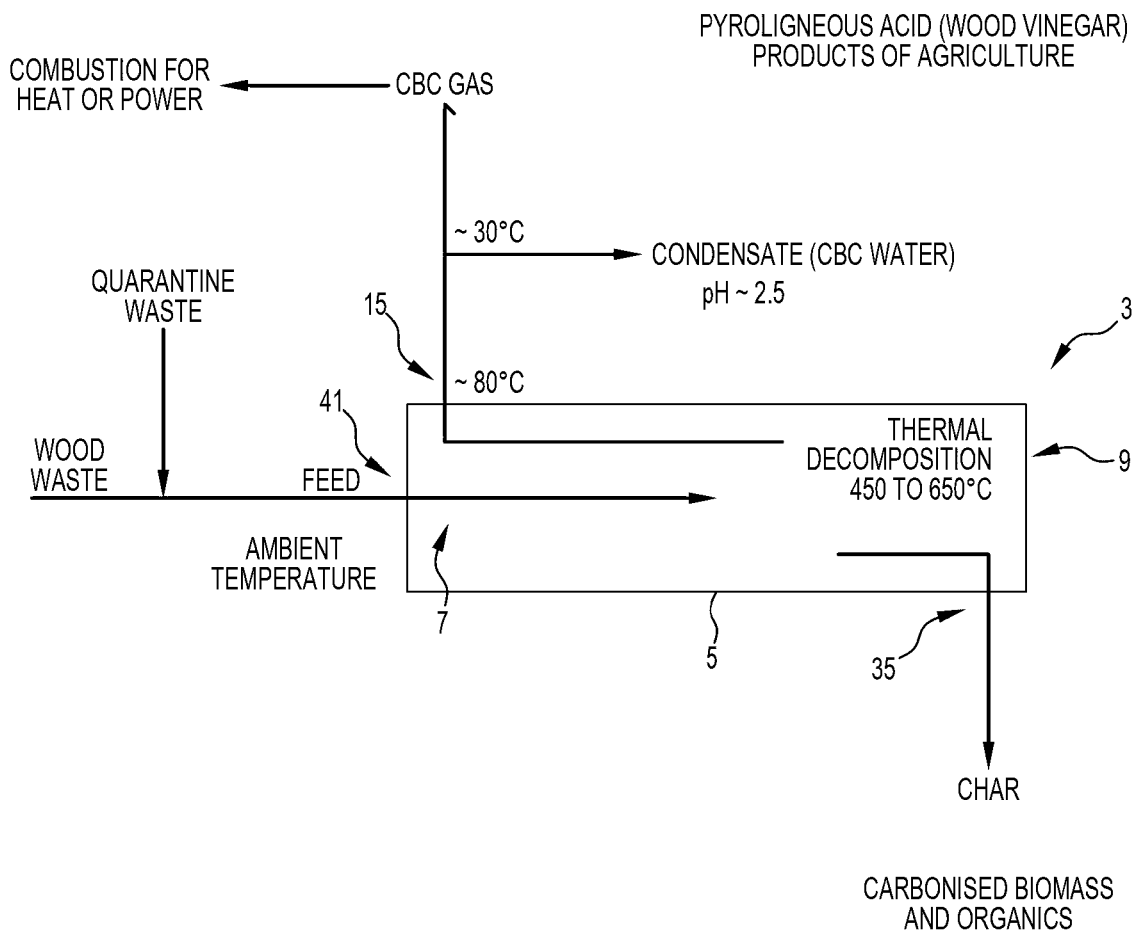
FIG. 1 is a diagram that illustrates one embodiment of a method and an apparatus for destroying biosecurity hazards in quarantined materials and producing valuable products that are safe and have economic value in accordance with the present invention.

FIG. 1 is a diagram that illustrates one embodiment of a method and apparatus for destroying biosecurity hazards in quarantined materials and producing valuable products that are safe and have economic value in accordance with the invention.

Figure 3:
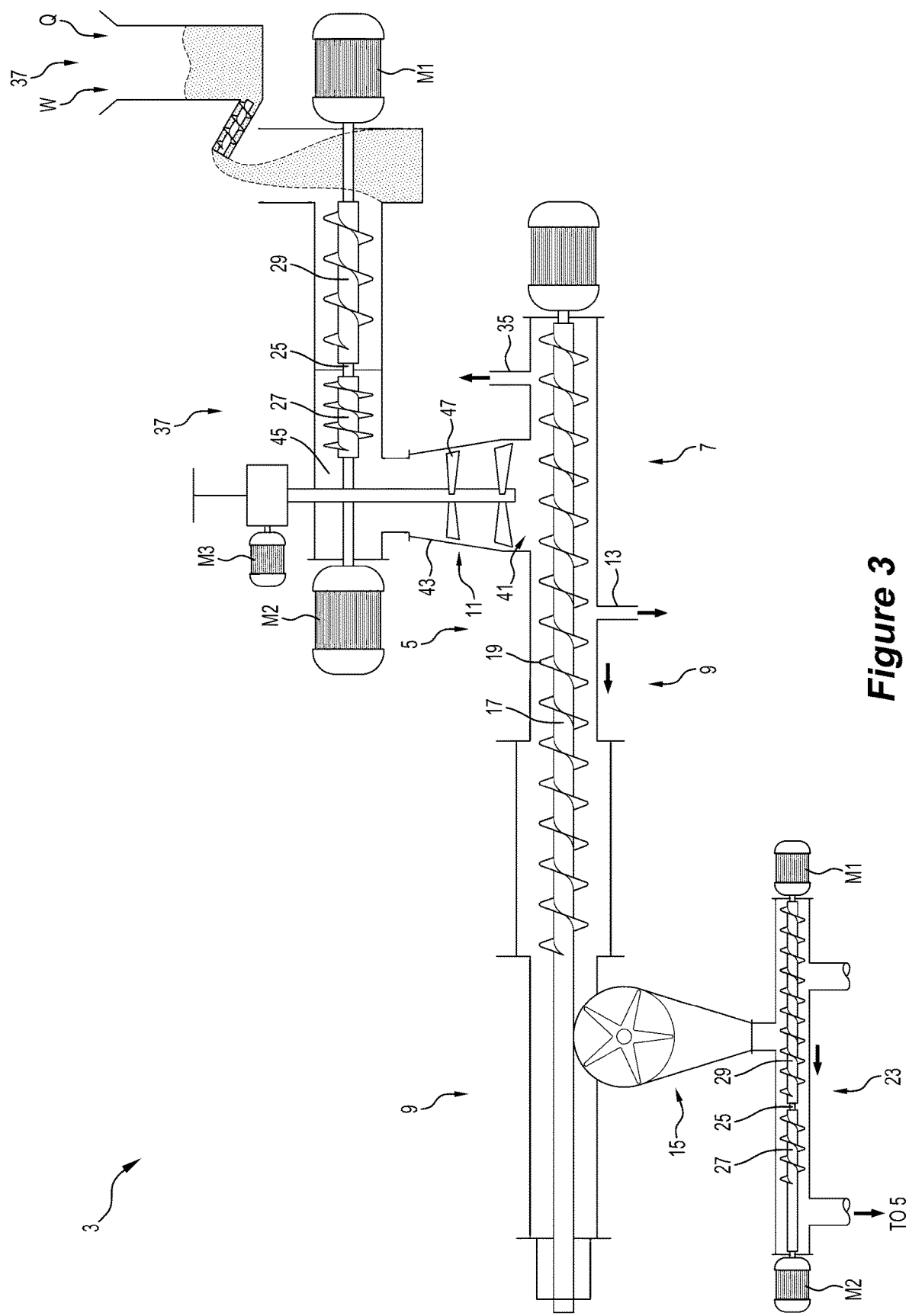
FIG. 3 is a perspective view of one embodiment of an apparatus in the form of a continuous converter in accordance with the invention.
Figure 4:
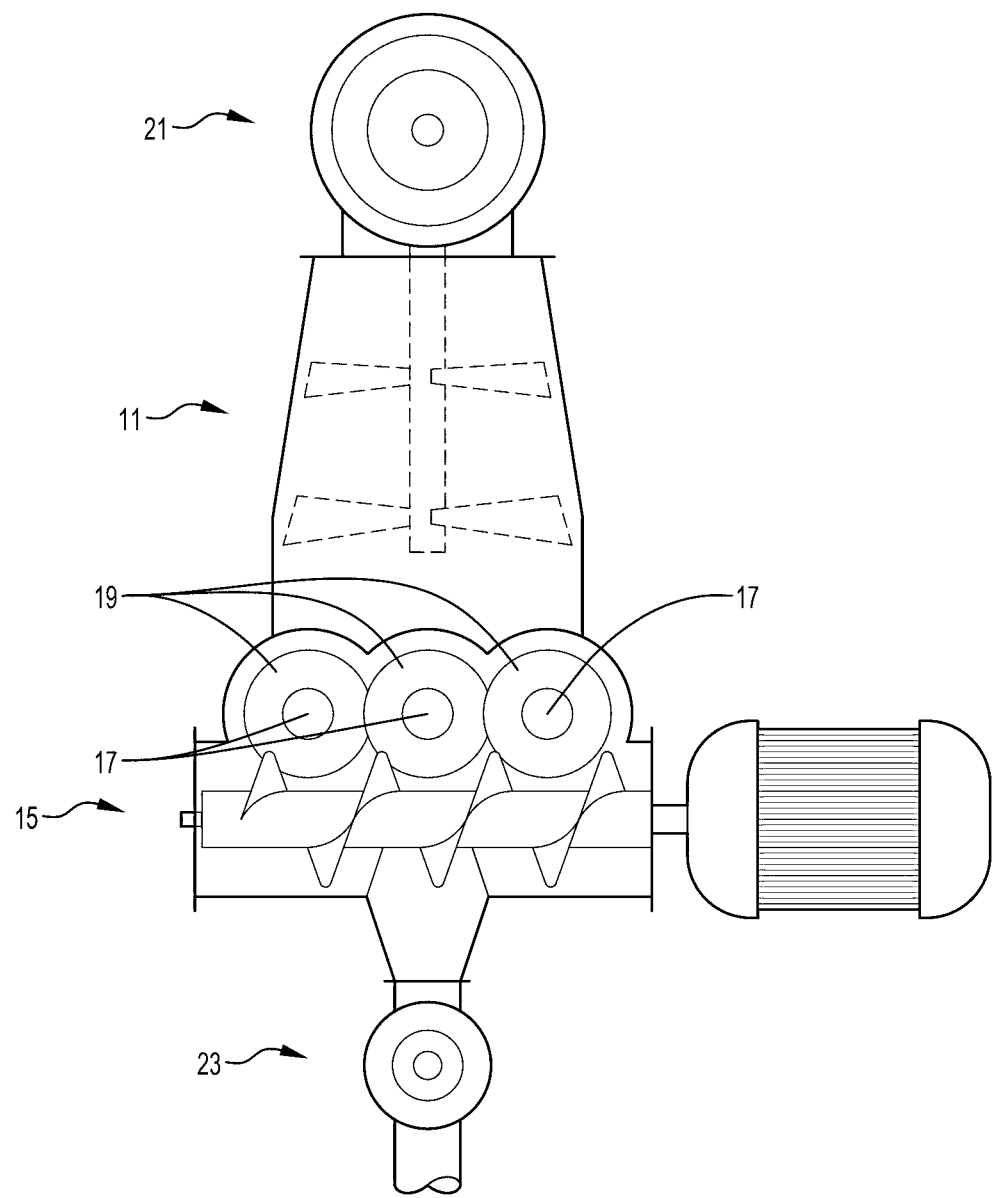
FIG. 4 is a transverse cross-section through the continuous converter along the line 5-5 shown in FIG. 4

With reference to FIG. 1, feed material in the form of quarantined materials and additional biomass in the form of wood waste is supplied at ambient temperature to an inlet of a reaction chamber 5 of continuous converter 3 shown diagrammatically in FIG. 1 and in more detail in FIGS. 3 and 4 and also described in International applications PCT/AU2009/000455 (WO2009/124359) and PCT/AU2014/001020 (WO2015/061833) in the name of the applicant.

The feed material is moved through the reaction chamber 5 from an inlet 41 at an upstream end 7 to a downstream end 9 of the chamber and is exposed to a temperature profile that reaches a maximum of 650° C. over a selected time period within the chamber 5 that destroys biosecurity hazards in the quarantined materials and pyrolyses the organic material in the feed material and releases water vapour and a volatile products gas phase as the feed material moves through the reaction chamber.

The water vapour phase and the volatile products gas phase produced by heating the feed material moves in a direction counter to that of the feed material. At least a part of the condensable components of the volatile products gas phase condense in cooler upstream sections of the chamber and form liquid oil/tars. The liquid oil/tars are carried forward in the reaction chamber by the feed material to the higher temperature regions of the reaction chamber and is progressively volatilised and cracked to a non-condensable gas. In some circumstances, liquid oil may be allowed to drain from the reactor 5 as a product.

A gas product and a dried and pyrolysed solid carbon-containing product are discharged from separate respective outlets 15, 35 in the reaction chamber 5.

The temperature profile in the reaction chamber 5 is selected and controlled so that the gas product discharged from the reaction chamber 5 is at a temperature of the order of 80° C. The gas product is transported away from the reaction chamber 5 and the water vapour phase and condensable components of the volatile products gas phase condense in cooler upstream sections at a temperature of the order of 30° C. and form (a) a water-based condensate product (water recovered from a pyrolysis process is typically somewhat acidic and contains dilute smoke chemicals and other organics; it is often referred to as pyroligneous acid or "wood vinegar" and has beneficial applications in horticulture) and (b) a separate fuel gas product that has sufficient calorific value to be combusted as an energy source.

The quarantined materials may be as described above.

As described above, the quarantined materials include biosecurity hazards and these hazards include any unwanted biological material—virus, bacteria, higher organisms such as fungi, plants and animals, by way of example, pathogens in animal material (including animal waste) and invasive species in food, plant material, wood, and animal material.

The additional biomass may be any suitable biomass having regard to the operational requirements for destroying the biosecurity hazards in the quarantined materials. These requirements take into account the nature of the quarantined materials and the operational requirements for moving quarantined materials though the reactor 5, having regard to the structural characteristics of the quarantined materials. The preferred char, gas and water outputs are also a consideration in the selection of the additional biomass. Wood waste is an example of a suitable additional biomass.

The relative amounts of the quarantined materials and the additional biomass may be selected as required having regard to the requirements for destroying the biosecurity hazards in the quarantined materials and materials handling considerations.

The solid char, gas and water-based condensate product outputs are intrinsically valuable, with a wide range of potential material and energy applications in industry and agriculture.

Figure 2:
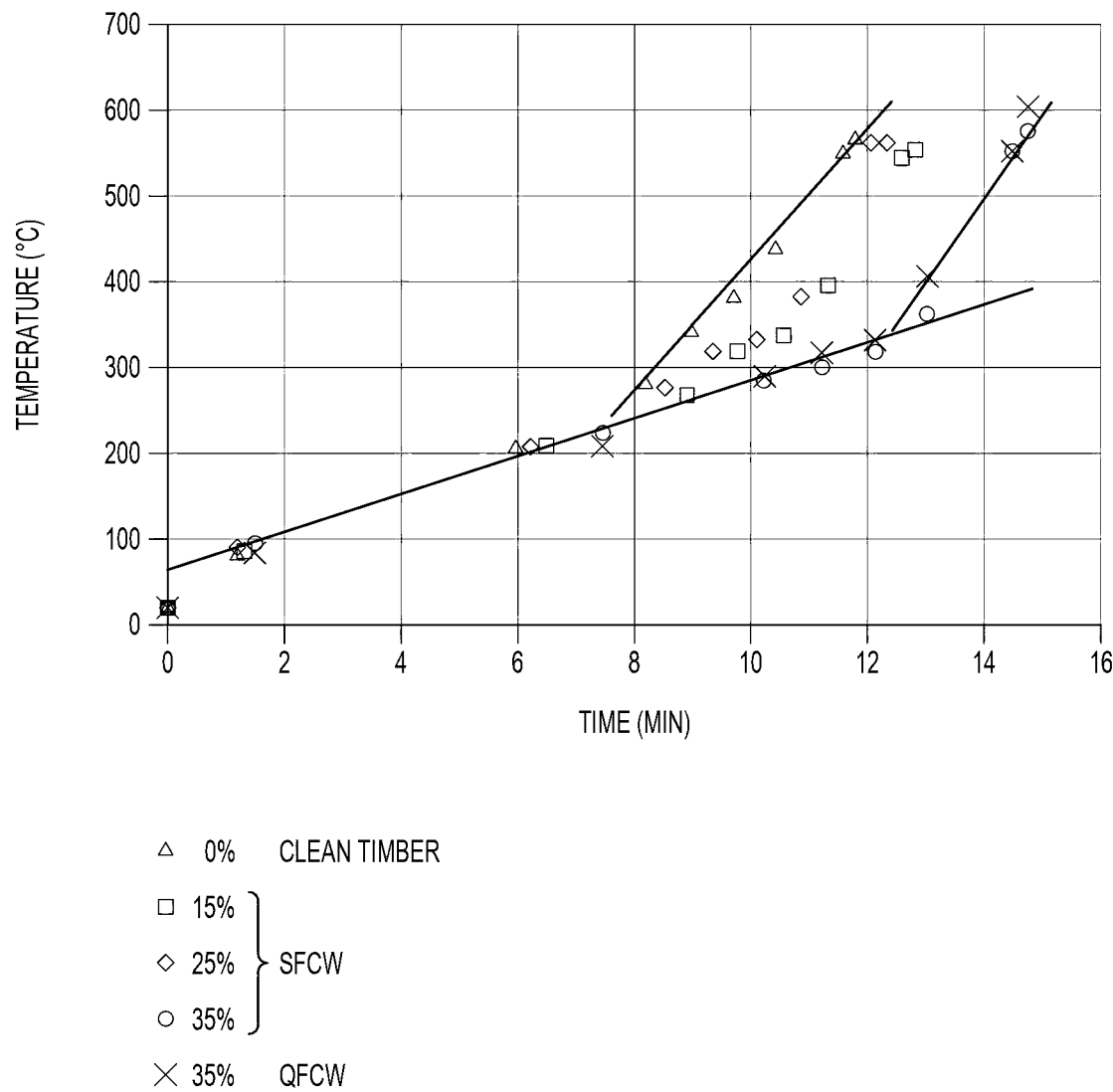
FIG. 2 is a temperature/time profile in the reaction chamber of a continuous converter for carrying out the method illustrated in FIG. 1, with the profile being generated from trial data described below.

Embodiments of suitable temperature profile in the reaction chamber are shown in FIG. 2.

FIG. 2 was generated from trial data described in more detail below.

The horizontal axis of FIG. 2 is time that a unit of feed material has been in the reaction chamber 5 measured in minutes and the vertical axis of the Figure is temperature in ° C. Time is a measure of position along the length of the reaction chamber 5.

FIG. 2 shows the results of trials with 5 different feed materials, with the feed materials of each trial having different amounts of quarantined material (labelled SFCW and QFCW in the Figure).

FIG. 2 shows that the temperature of the feed material in each trial increased steadily to approximately 250° C. after 8 minutes within the reaction chamber 5.

FIG. 2 also shows that the temperature of the feed material having no quarantined material then increased quickly generally linearly during the next 4 minutes to 600° C. This sharp increase indicates thermo-chemical reactions of the feed material, i.e. Zone 3 of the temperature profile described above.

FIG. 2 also shows similar sharp increases in temperature at later start times having increasing proportions of quarantined material, with the start times being a function of the increasing proportions of quarantined material in the feed materials. Basically, the steady heating of the feed materials continued along the lower gradient line shown in the Figure until the temperature reached a point where significant thermo-chemical reactions commenced and there was a sharp increase in temperature.

It is evident from FIG. 2 that the five feed materials had the same basic temperature-time profiles, with the only differences being the temperature and time at which the increased heating rate commenced.

Basically, FIG. 2 shows an extended temperature-time gradient in a countercurrent solids/gas reactor. The trial results described below establish that the extended temperature-time gradient shown in FIG. 2 make it possible to process quarantined feed materials in a safe and effective way and generate valuable products.

FIG. 2 illustrates that the temperature profile in the reaction chamber includes the following zones extending successively along the length of the reaction chamber from the upstream end to the downstream end of the reaction chamber:

(a) a drying zone (Zone 1) for drying the feed material—typically increasing from 60-80° C. at the inlet to 100-150° C. at the upper temperature limit of Zone 1, (b) a pre-heating zone (Zone 2) for heating the feed material to a temperature that is suitable for the thermo-chemical reactions required in the Zone 3—typically 250-300° C. is the upper limit of Zone 2, and (c) a thermo-chemical reaction Zone 3 for thermally decomposing the feed material and producing a solid carbon-containing, typically char product, and gas.

With reference to FIGS. 3 and 4, the embodiment of the apparatus in the form of a continuous converter, generally identified by the numeral 3, for destroying biosecurity hazards in quarantined materials shown in the Figures includes a reaction chamber 5 that has an upstream colder end 7, an inlet 41 for feed material (including quarantined materials and additional biomass material), a downstream hotter end 9, outlets 13, 35 for discharging liquid water and gas products respectively from the chamber 5 at the upstream end, and an outlet 15 for discharging a solid carbon-containing product, for example in the form of char, at the downstream end of the chamber 5.

The converter 3 also comprises a feed hopper 37 for suppling organic feed material to the upstream end of the reaction chamber. The feed hopper may be a sealed or an open hopper.

The converter 3 also comprises an assembly that forces feed material continuously forwardly in the reaction chamber 5 from the upstream end 7 towards the downstream end 9. The assembly comprises three parallel rotatable shafts 17 and screw feeders 19 on the shaft. The screw feeders 19 are interleaved. One shaft 19 is a motor-driven shaft via motor M4 and the other shafts 19 are linked to rotate with the driven shaft. This is a simple and reliable arrangement whereby rotation of the shafts 17 about their axes forces feed material from the upstream end towards the downstream end of the chamber 5. The feed screw arrangement can include a single or any other suitable number of multiple screws, which may or may not be interleaved.

The converter 3 also includes an intruder 21 (i.e. a gas-sealed entry device) for supplying feed material to the reaction chamber 5 and an extruder 23 (i.e. a gas-sealed discharge device) for discharging the solid carbon-containing product from the chamber 5. Each device includes two screws 27, 29 on the same axis. The screws 27, 29 are mounted to counter-rotate with respect to each other about the axis. It is noted that the screws 27, 29, may be arranged to rotate in the same direction. The screws are separated by an axial gap 25. The intruder 21 controls the rate of supplying feed material to the reaction chamber 5 and compresses feed material and forms a seal that minimises escape of gas from the chamber 5 via the intruder. Each screw 27, 29 is independently driven by a motor M1, M2 with variable speed capability so that in use the downstream screw 27 runs at a slower rotation rate than the upstream screw 29. The difference in the rates of rotation causes feed material supplied to the upstream screw 29 from the feed hopper 37 and transported to the gap 25 to be compressed in the gap 25 and to enter the downstream screw 27 as compressed material and to travel forward as compressed material via the downstream screw 27.

The method and the seal quality may be controlled by setting the motor torque of the motors M1 and M2 to a level determined to be required to deliver a required level of compression. Typically, motor torque and not rate of rotation is set for control purposes. Typically, the rate of rotation of the upstream screw 29 is linked directly to the rate of rotation of the motor-driven screw feeder 19 in the reaction chamber 5 to control throughput. Typically, the rate of rotation of the downstream screw 27 is controlled to maintain constant torque of the upstream screw 29 of the intruder 21 to control compression. The packing density of the feed material to achieve a required seal may be dependent on a number of factors, including the characteristics of the feed material. The characteristics may include the packing characteristics of the feed material.

It is noted that the opposite arrangement may be used for control purposes. Specifically, the rate of rotation of the downstream screw 27 may be linked directly to the rate of rotation of the motor-driven screw feeder 19 in the reaction chamber 5 to control throughput and the rate of rotation of the upstream screw 29 may be controlled to maintain constant torque of the downstream screw 27 of the intruder 21 to control compression.

Similarly, the extruder 23 controls the rate of discharging solid carbon-containing product from the reaction chamber 5 and forms a seal that prevents escape of gas from the reaction chamber 5 via the extruder 23. The intruder 21 and the extruder 23 have the same basic structural components and these are identified by the same reference numerals in the Figures.

The converter 3 also includes a feed assembly generally identified by the numeral 11 for controlling the flow of feed material from the intruder 21 to the inlet 41 of the reaction chamber 5. The feed assembly 11 includes a transfer chute that is in the form of a distribution box 43 between an outlet 45 of the intruder 21 and the inlet 41 of the reaction chamber 5 and a sweeper blade 47 that is rotatable about a central vertical axis of the distribution box 43 via operation of a motor M3 to control the distribution of feed material to the reaction chamber inlet 41.

In use, feed material from the outlet 45 of the intruder 21 falls downwardly through the inlet 41 into an upstream end of the reaction chamber 5 and is moved forward, for example by means of an auger in the reaction chamber, through the reaction chamber 5 and is thermally decomposed and then discharged as a solid carbon-containing product from the chamber 5 via the extruder 23, with liquid water and gas products also being produced and discharges from the chamber 5 via the outlets 13, 35 as the feed material moves through the chamber 5.

Typically, the feed rate to the reaction chamber 5 is controlled to ensure that the chamber is full of feed material.

The sweeper blade 47 is important to ensuring that there is a uniform distribution of feed material delivered to the inlet of the reaction chamber 5, i.e. so that the reaction chamber 5 is full of feed material.

The level of feed material in the distribution box 43 is also an important consideration from an operational viewpoint. The applicant has found that the apparatus may block if the level of feed material is too high.

The method of operating the converter 3 includes measuring the torque on the sweeper blade 47 to provide an indication of the level of feed material in the distribution box and adjusting the rate of rotation of the upstream screw of the intruder 21 to control the supply rate of feed material to maintain the desired level of feed material in the distribution box 43.

The converter 3 has structural features that make it possible to establish and maintain a required temperature profile in the reaction chamber 5 to operate one embodiment of the method of the present invention in the reaction chamber 5.

In particular, important features of the converter 3 include, for example, selection of the length of the reaction chamber 5, selection of the feed (e.g. biomass) and the feed rate (i.e. organic material) through the chamber 5, providing targeted injection of oxygen-containing gas into the chamber 5, providing targeted injection of liquid water into a downstream end of the chamber 5 for char cooling, and providing a means for achieving internal heat transfer within the chamber.

The converter 3 is particularly suited for a method that operates so that there is total destruction of the liquid oil product produced in the chamber. Specifically, the method is operated so that there is volatilization and cracking of liquid oil and tar product that forms in the chamber to the extent that there is total destruction of the liquid oil and tar product into a non-condensable gas that is discharged from the upstream end of the chamber. Having said this, there may be situations in which it is desirable to drain some oil from the chamber 5 as a separate product.

The applicant has carried out a series of trials on simulated quarantined material in the form of simulated flight catering waste as produced typically during an aircraft flight. The applicant has also carried out a trial on actual quarantined material supplied by an airline.

The trials are described below.

A. Trials on Simulated Quarantined Material

Feed Preparation

Trials were conducted with simulated flight catering waste (SFCW).

The "recipe" of the SFCW was based on a Qantas audit of material collected from international flights arriving at Mascot Airport in Sydney.

Table 1 summarises the components of the SFCW:

TABLE 1

SFCW Components

| SFCW Components | Proportion (dry weight) | Sourcing and Preparation |
|---|---|---|
| Food | 58% | Dehydration product, Eco-Guardians, Melbourne |
| Plastic | 20% | 30% LDPE, 30% HDPE, 30% PP, 10% HIPS, Astron Plastics, Ingleburn |
| Paper | 13% | House Without Steps, Mayfield |
| Aluminium | 4% | PAR Recycling, Somersby |
| Glass | 4% | |

The SFCW was also prepared to the following feed material specification of the applicant:
 total moisture content <15%.
 size: minus 20 mm and <10% minus 1 mm.

The SFCW was blended with clean wood waste to produce three blends, one blend having 15 wt. % SFCW, a second blend having 25 wt. % SFCW, and a third blend having 35% SFCW.

Trial Procedure

In total, six processing trials were conducted at around 300 kg/hr, with an accumulated operating period of some 25 hours.

In each trial, after a period of at least 1 hour of stable operation with clean wood waste in the reaction chamber 5 of the converter 3, controlled amounts of SFCW were added each minute to the metering screw of the feed hopper of the apparatus. The additions corresponded to 15 wt. %, 25 wt. % and 35 wt. % SFCW in the SFCW/wood blends.

It was found in the trials that, in this range of SFCW additions, stable operations and effective carbonisation were achieved.

The maximum SFCW level trialled, i.e. 35 wt. % SFCW in the SFCW/wood blends, was adopted for subsequent consolidation runs, involving emission monitoring and the processing of actual quarantined material.

Effective Carbonisation

The degree of carbonisation (char making) is an indicator of the effectiveness of the apparatus in processing SFCW/wood blends. The reason for this is that, if there is effective decomposition of the lignin, cellulose and hemi-cellulose to char, it follows that biota cannot survive and the various organics in the food, plastic and paper will also decompose.

Table 2 summarises the carbonisation of the SFCW/wood blends and a comparative example for 100% wood.

TABLE 2

Carbonisation Results

| Char Properties (DAF basis) | Clean Wood | 15% SFCW | 25% SFCW | 35% SFCW |
|---|---|---|---|---|
| Calorific Value (GJ/t) | 33.8 | 33.4 | 33.4 | 33.3 |
| Volatile Matter (%) | 10.2 | 9.8 | 12.1 | 13.4 |
| Carbon (%) | 90 | 90 | 89 | 88 |
| Hydrogen (%) | 2.3 | 2.0 | 2.4 | 2.4 |
| Oxygen (%) | 5.6 | 5.8 | 6.4 | 6.7 |

A dry ash-free (DAF) calorific value above 30 GJ/t is a measure of effective carbonization. The addition of SFCW to wood in SFCW/wood blends up to 35% SFCW did not compromise the carbonisation process (DAF CV >33 GJ/t in all cases).

Process Stability

Figure 5:
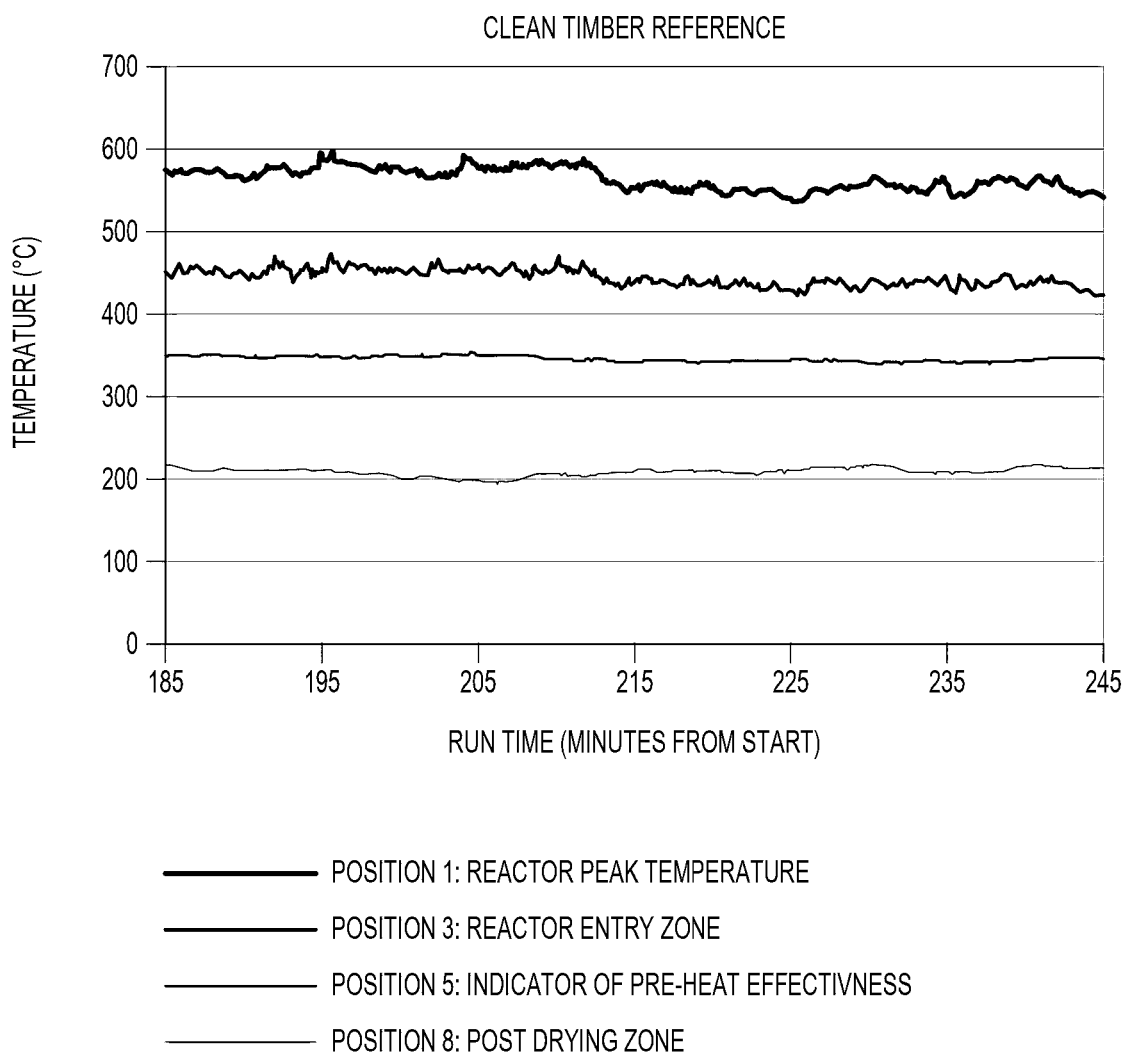
FIG. 5 is a temperature-time graph at a series of locations along the length of a reactor for a trial with a feed material comprising 100 wt. % wood feed material, i.e. 0 wt. % simulated quarantined material, used as a reference in trials of an embodiment of the method and the apparatus of the invention, with the graph illustrating a 1 hour period of the trial.
Figure 6:
FIG. 6 is a temperature-time graph at a series of locations along the length of a reactor for a trial with a feed material comprising 35 wt. % simulated quarantined material and 65 wt. % wood as additional biomass in trials of the embodiment of the method and the apparatus of the invention mentioned in the description of FIG. 5, with the graph illustrating a 1 hour period of the trial.

It was clear from the trial data, for example FIGS. 5 and 6, that the addition of SFCW up to 35 wt. % in the SFCW/wood blends did not compromise process stability.

The control system of the apparatus made adjustments to the operating parameters in response to the changes in feed properties (composition and packing density).

For instance, the solids moved more slowly through the apparatus with 35 wt. % SFCW compared to the 100% wood reference, but the net production rate was higher due to the increased packing density of the blend.

FIGS. 5 and 6 are temperature-time graphs for 1 hour periods of trials with 0 and 35 wt. % SFCW at different positions along the length of the reactor.

It is clear from the Figures that the temperature profiles at the same positions are similar.

The data showed the same results with the other trials.

Temperature-Time

As discussed above, FIG. 2 shows the temperature-time profiles of trials with five different feed materials, the feed materials of each trial having different amounts of quarantined material (labelled SFCW and QFCQ in the Figure). Four of the plots in FIG. 2 are for trials on 0, 15 wt. %, 25 wt. %, and 35% SFCW.

As discussed above, FIG. 2 shows that the temperature of the feed material in each trial increases steadily to approximately 250° C. after 8 minutes within the reaction chamber 5.

The temperature of the feed material that had no quarantined material increased quickly generally linearly from this point during the next 4 minutes to 600° C.

FIG. 2 also shows similar sharp increases in temperature at later start times, with the start times being a function of the increasing proportions of quarantined material in the feed materials.

From a quarantine management perspective, one of the key factors is "time at temperature" for the solids travelling through the reaction chamber 5 of the converter 3.

For perspective, the distance the solids travel from feed entry to char discharge is some 4 m and there was a total residence time of solids inside the apparatus of around 15 minutes.

On the journey through the reaction chamber 5, the solids are first fully dried, then pre-heated and finally carbonised in the reactor section.

The results of the trials show that times at temperature are clearly sufficient to destroy biota in the flight catering waste, thus eliminating bio-security risks.

Furthermore, the times at temperatures for effective thermal decomposition of wood and the plastics and other organics in the catering waste (300-600° C.), were not compromised (ca 5 minutes) by the presence of the SFCW.

The times at temperature are illustrated by Table 3 below.

TABLE 3

| | Catering Waste in Blend | | | |
|---|---|---|---|---|
| | 0% SFCW | 15% SFCW | 25% SFCW | 35% SFCW |
| Total Time in CBC | 13.4 | 14.6 | 14.0 | 16.8 |
| Time above 100° C. | 11.3 | 13.0 | 12.4 | 14.9 |
| Time above 200° C. | 7.4 | 8.6 | 8.0 | 10.3 |

TABLE 3-continued

| | Catering Waste in Blend | | | |
|---|---|---|---|---|
| | 0% SFCW | 15% SFCW | 25% SFCW | 35% SFCW |
| Time above 300° C. | 5.0 | 5.2 | 5.0 | 4.6 |
| Time above 400° C. | 3.5 | 3.3 | 3.0 | 3.4 |
| Time above 500° C. | 2.3 | 2.0 | 2.3 | 2.6 |

As an approximation, and having regard to FIG. 2, the first third of the journey through the reaction chamber 5 of the converter 3, i.e. Zone 1, dries the feed material (with solids reaching temperatures of 100-150° C.), the second third, i.e. Zone 2, preheats the feed material (to 250-300° C.), and the final section, i.e. Zone 3, is where the bulk of the thermo-chemical reactions take place with peak temperatures in the reactor reaching around 650° C.

Products

The trials produced valuable solid char, wood vinegar (i.e. a water-based condensate), and gas products. These are commercially valuable products Test work verified the effectiveness of the embodiment of the method and apparatus of the invention in terms of destroying bio-security hazards and in producing valuable products.

In particular, the analysis of the trials showed that the gas generated from processing 35 wt. % SFCW is clean burning, with all emission monitoring parameters, except NOx and HCl, well below the Australian EPA Group 6 standards, without a gas cleaning step prior to combustion. There are counter-measures available for the NOx and HCl emissions.

The results are summarised in Table 4 below.

| Gas Combustion Parameters | EPA Group 6 Limits | Emissions (35 wt. % SFCW) |
|---|---|---|
| Smoke (Opacity) | 20% | No visible |
| Particulates | 50 | 24 |
| VOC's (as n-propane) | 40 | 5.4 |
| Chlorine | 200 | <0.07 |
| Fluorides (as HF) | 50 | <0.08 |
| Hydrogen Chloride | 100 | 490 |
| Hydrogen Sulphide | 5 | <0.5 |
| Type 1 and 2 Metals Total | 1 | 0.098 |
| Cadmium | 0.2 | <0.0006 |
| Mercury | 0.2 | <0.0002 |
| Dioxins/Furans (ng/Nm$^3$ TEQ) | 0.1 | 0.012 |
| No$_x$ (as NO$_2$) | 450 | 560 |
| Sulphuric Acid Mist (as SO$_3$) | 100 | 25 |
| Sulphur Dioxide | 1,000 | 140 |

B. Trials—Actual Quarantined Material

Once the basic operating parameters, product assessments and emissions monitoring had been completed with SFCW, there was a final trial using actual quarantine catering waste from Qantas international flights arriving at Mascot Airport, Sydney. This waste is described below as QFCW.

The preparation and execution of this trial was closely supervised by the Australian Federal Government quarantine regulator, Department of Agriculture and Water Resources. Department officers were on site for three days to ensure that the trial was conducted successfully within the agreed protocols.

About 600 kg of actual catering waste was collected from Mascot Airport.

An initial proposal of separating out the bulk liquids and the plastic, glass and aluminium, and only drying the food, proved impractical, given the wet and compacted nature of the material. All the QFCW was dried in the as-received mixed condition.

The dried material was shredded in its mixed form ready for feeding to the reactor chamber 5 of the converter 3. The dried material was subsequently added to the metering screw of the converter 3. Clean wood was delivered via the hopper. Blending of QFCW and timber took place within the enclosed feed system of the reactor (at 35% QFCW blend rate).

The processing in the reaction chamber 5 was conducted over a 5 hour period.

After 2 hours of stable operations with the wood reference material, controlled additions of the QFCW were made for 2 hours. This was followed by a 1 hour return to clean wood processing.

Figure 7:
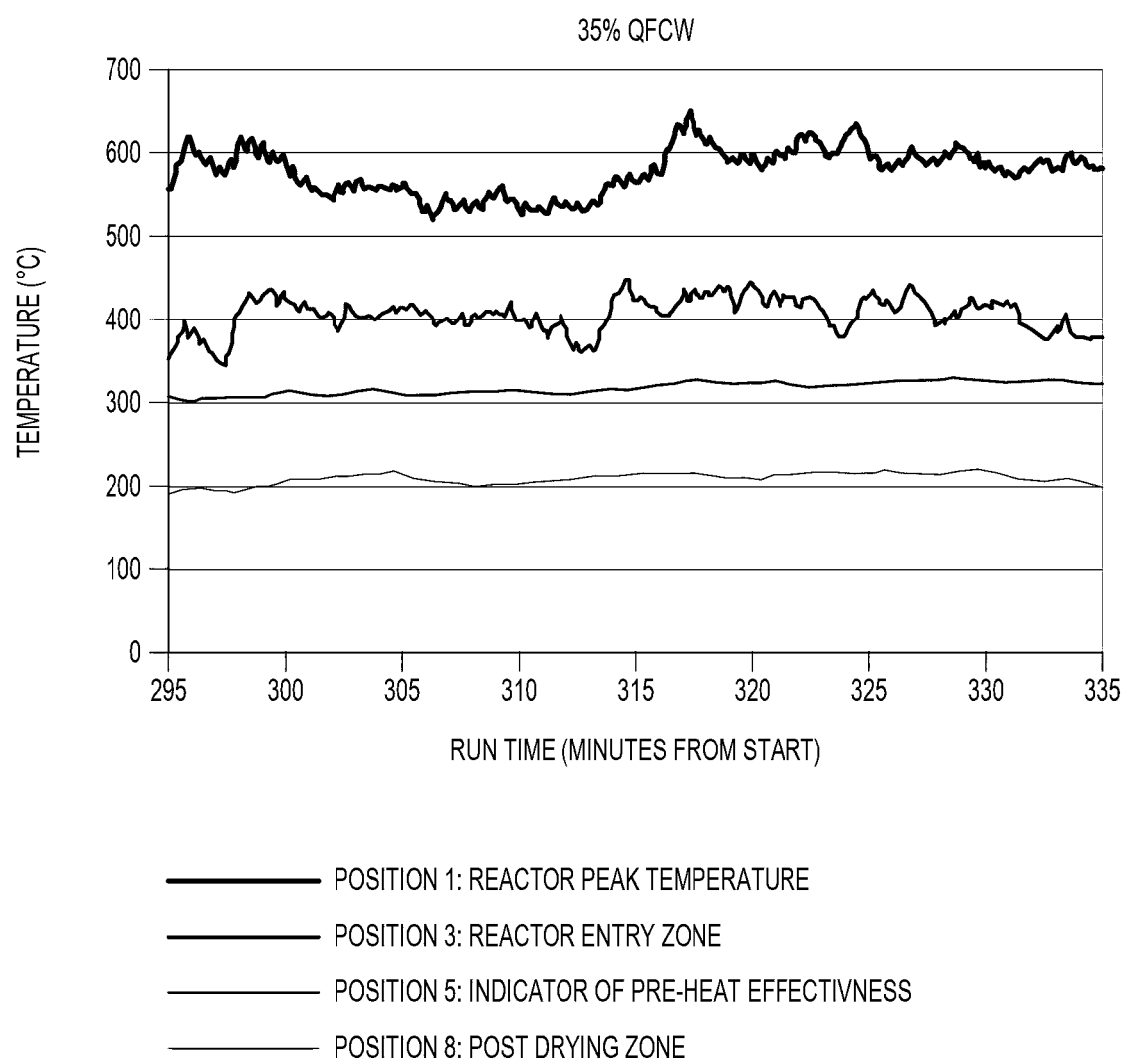
FIG. 7 is a temperature-time graph for a feed material comprising 35 wt. % actual quarantined material in the form of aircraft catering waste and 65 wt. % wood as additional biomass in a trial of the embodiment of the method and the apparatus of the invention.

FIG. 7 is a temperature-time graph for the trial FIG. 7 shows that there was stable operation in the trial. In this regard, whilst the operating parameters (air injection rates and throughput) were adjusted by the control system for the period of QFCW additions, process stability was not compromised.

It is noted that the temperature-time results for simulated and actual quarantine flight catering waste shown in the Figures, at 35% blending rate, were very similar. This is validation for the simulation methodology.

Inputs and outputs were measured in the trial to determine the product mass and energy yields.

The results are shown in Table 6 on a "per tonne of feed" basis.

Table 5—Product Yields Per Tonne of Feed Material

| | Wood only | 35% QFCW |
|---|---|---|
| Feed Material (moisture content) | 1,000 kg 17.6 GJ (12%) | 1,000 kg 17.8 GJ (11%) |
| Char (dry weight basis) | 328 kg 10.8 GJ | 272 kg 8.0 GJ |
| Wood Vinegar | 434 litres | 444 litres |
| Product Gas | 496 Nm$^3$ 2.8 GJ | 545 Nm$^3$ 4.4 GJ |

It is evident from the data in Table 5 that:

Compared to the wood only feed material, 35% QFCW produced less char mass and energy and more gas volume and energy.

The wood vinegar, i.e. water-based condensate product, yield remained essentially unchanged and was substantially the same for both feed materials.

Some 20% of typical flight catering waste is made up of plastics, and this is the likely explanation of the lower char yield and higher gas yield for the 35 wt. % QFCW.

Figure 8:
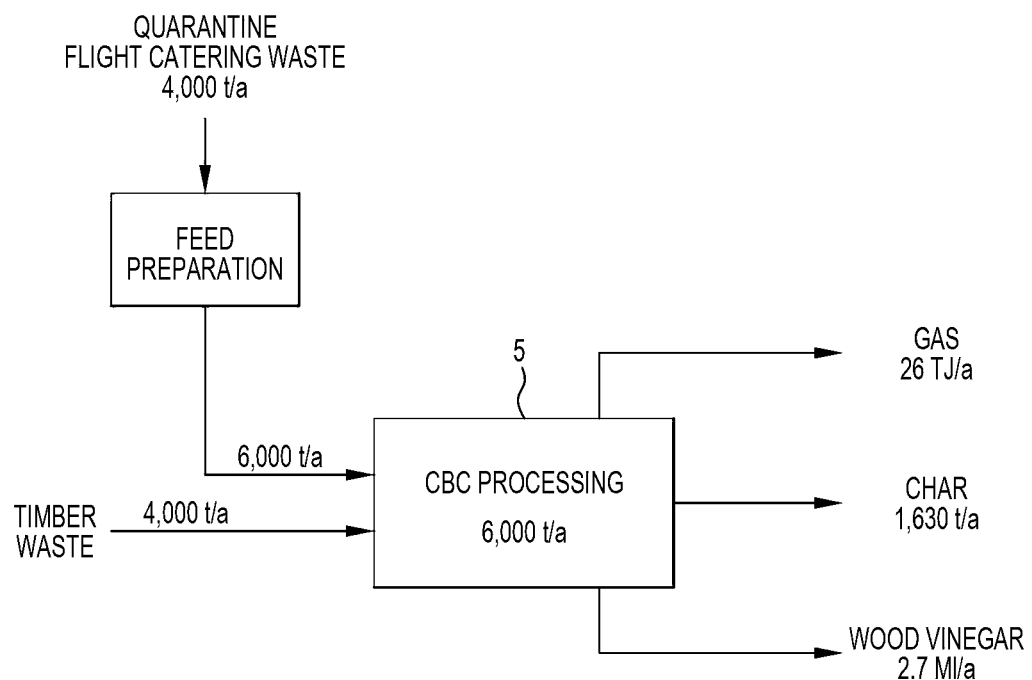
FIG. 8 is an embodiment of a method for destroying biosecurity hazards in quarantined materials in the form of aircraft catering waste in accordance with the invention.

The data is presented in FIG. 8 on an annualised basis, scaled to the volumes of Qantas international flight catering waste at Mascot (4,000 t/a), which after de-watering and drying becomes 2,000 t/a QFCW as feed material. Annual production assumes a converter feed ratio of 2:1 timber to flight catering waste.

It is noted that char and wood vinegar yields and properties were taken from the final trial with actual quarantine flight catering waste (QFCW). This trial was conducted with 35 wt. % flight catering waste (dried and shredded) in the reaction chamber 5 feed.

Plant for Processing Quarantined Material

An engineering study of a commercial plant for processing timber and quarantine flight catering wastes has been made.

The plant was designed based on the process parameters established in the trials, including a 2:1 weight ratio of timber to quarantine flight catering waste in the feed material.

Figure 9:
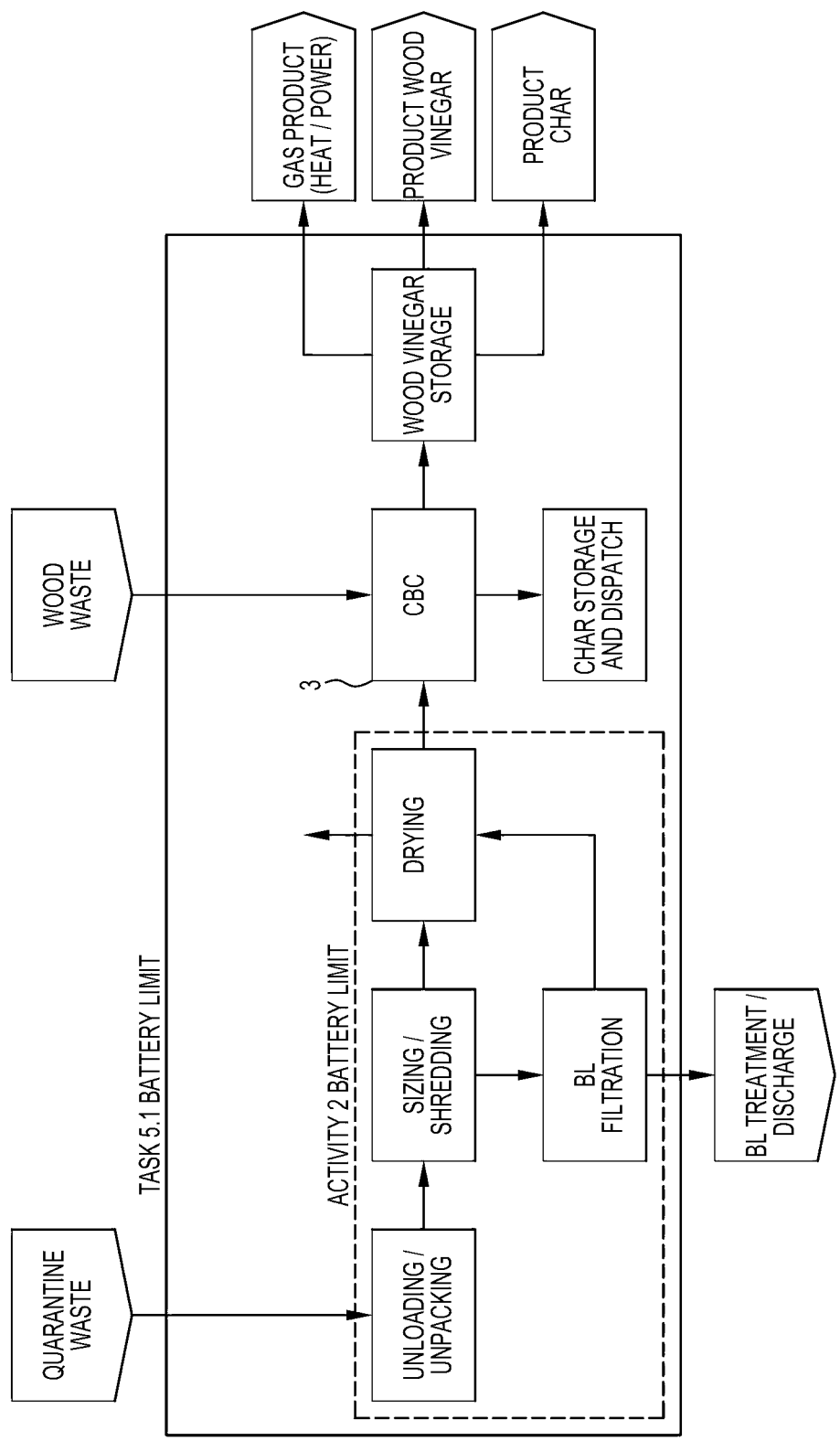
FIG. 9 is diagram of the unit operations of an embodiment of a plant for destroying biosecurity hazards in quarantined materials in accordance with the invention.
Figure 10:
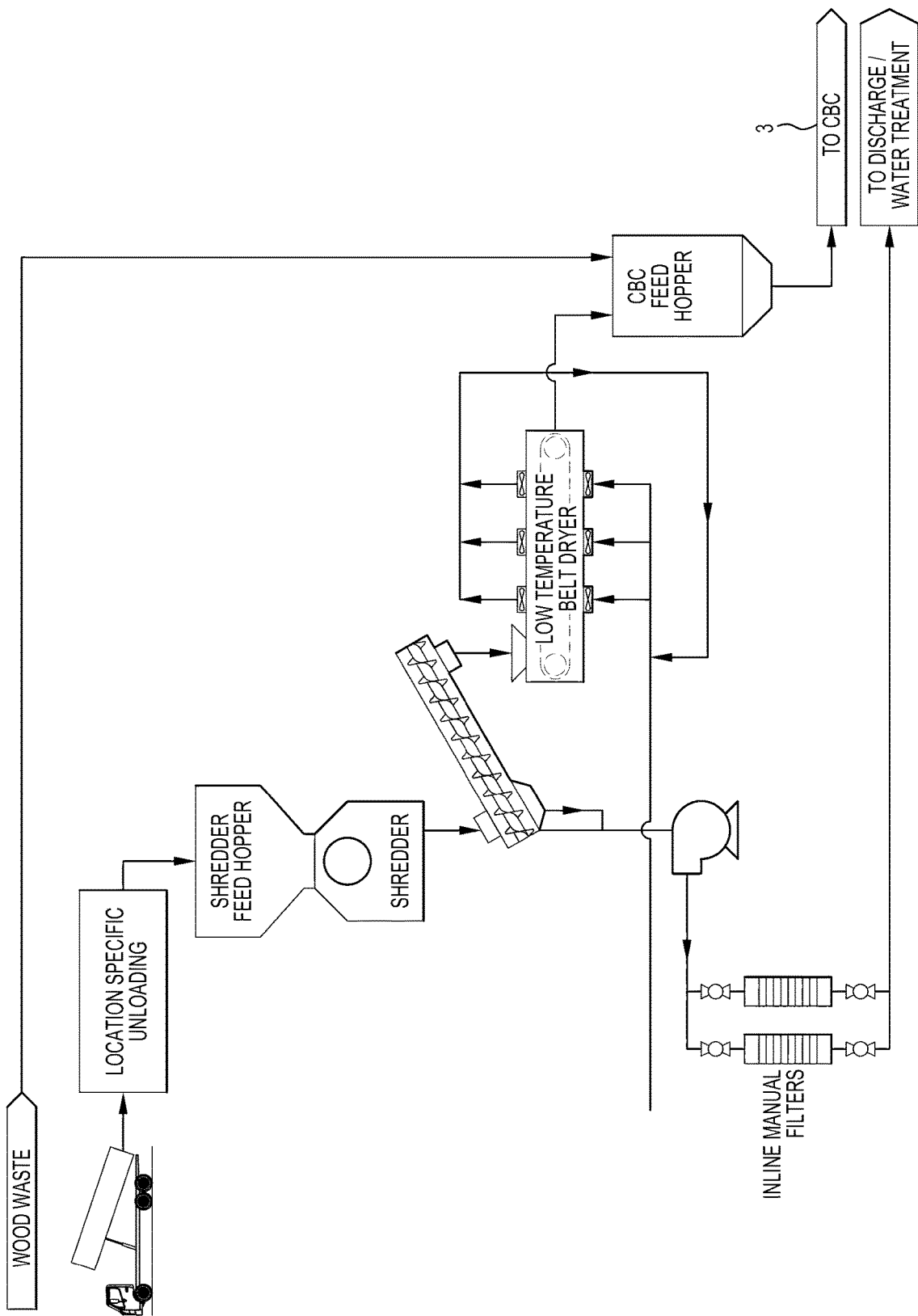
FIG. 10 illustrates diagrammatically the feed preparation unit operations of the plant shown in FIG. 9.

The plant developed in the study is shown in FIGS. 9 and 10.

FIG. 8 is also relevant. Basically, FIG. 8 is an embodiment of a method of destroying biosecurity hazards in quarantined materials in the form of aircraft catering waste in accordance with the invention, with feed inputs and product outputs.

The inputs to the plant, scaled to Qantas international flight waste at Mascot, are 4,000 t/a timber waste and 4,000 t/a flight catering waste (QFCW).

The plant unit operations successively shred, dewater and dry the QFCW on site to 2,000 t/a.

The wood waste is delivered to the site in a form ready for processing in the converter.

Thus, the plant processes 6,000 t/a of prepared material.

More particularly, with reference to FIG. 9, the unit operations of the plant include:
(a) unpacking quarantined material,
(b) sizing and shredding the quarantined material,
(c) de-watering the shredded quarantined material, with the removed water being filtered and discharged;
(d) drying the de-watered solids of the quarantined material,
(e) transferring the dried quarantined material to an inlet of the converter 3;
(f) blending the dried quarantined material and a wood waste of required feed properties at the inlet end of the converter 3,
(g) processing the blended feed material in the reaction chamber of the converter 3,
(h) recovering products in the form of a gas, solid char and water-based condensate (wood vinegar).

FIG. 10 illustrates diagrammatically an embodiment of the feed preparation unit operations for quarantined material described in items (a) to (e) above.

By way of summary, the method and the apparatus of the present invention create a completely unique thermo-chemical environment compared to known pyrolysis technologies that are commercially available or under development and this environment provides a safe and effective option for processing quarantined materials and producing valuable products.

Many modifications may be made to the embodiment of the method and the apparatus of the present invention shown in the drawings without departing from the spirit and scope of the invention.

By way of example, whilst the embodiment described in relation to the drawings includes three parallel rotatable shafts 17 and interleaved screw feeders 19 on the shafts 17, the invention is not limited to this arrangement and extends to any alternative arrangements for moving feed material along the chamber 5 and is not limited to this number of rotatable shafts 17 and interleaved screw feeders 19.

By way of further example, whilst the embodiment described in relation to the drawings includes particular forms of the intruder 21 and the extruder 23, the invention is not limited to this arrangement and extends to any alternative arrangements for supplying feed material to the chamber 5 and discharging solid product from the chamber 5 which creates effective gas seals for the chamber 5.

By way of further example, whilst the embodiment described in relation to the drawings includes a particular feed assembly 11 for controlling the flow of feed material from the intruder 21 to the inlet 41 of the reaction chamber 5, the invention is not limited to this arrangement and extends to any suitable alternative arrangements.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A method for converting a feed material to a plurality of products in a continuous converter including a reaction chamber, an inlet for supplying the feed material to an upstream end of the reaction chamber, an assembly for moving the feed material through the reaction chamber from the upstream end towards a downstream end of the reaction chamber, and a plurality of outlets for discharging the products from the reaction chamber, the method including the steps of:
   (a) supplying the feed material to the upstream end of the reaction chamber via the inlet, the feed material comprising quarantined materials and biomass, the quarantined materials comprising between 25 wt % and 50 wt % of the total mass of the quarantined materials and the biomass;
   (b) moving the feed material through the reaction chamber from the upstream end to the downstream end and exposing the feed material within the reaction chamber to a time-temperature profile such that the feed material is heated from 200° C. to 600° C. over a period of 5-20 minutes which destroys biosecurity hazards in the feed material and dries and pyrolyses organic material in the feed material and releases water vapour and a volatile products gas phase from the feed material as the feed material moves through the reaction chamber;
   (c) moving the water vapour and the volatile products gas phase produced in step (b) through the reaction chamber in a direction counter to that of the feed material so that at least a part of the water vapour and condensable components of the volatile products gas phase condense in cooler upstream sections of the reaction chamber and form liquid water and liquid oil, at least the liquid oil being carried forward in the reaction chamber by the feed material to higher temperature regions of the reaction chamber and being progressively volatilised and cracked to a non-condensable gas;
   (d) discharging from the reaction chamber (i) a gas product via a gas product outlet and (ii) a dried and pyrolysed solid carbon-containing product from a solid product outlet; and
   (e) condensing water vapour from the gas product outside the chamber and forming a liquid water product.

2. The method defined in claim 1 wherein the feed material is less than 25 mm in size.

3. The method defined in claim 1 wherein less than 15 wt. % of the total mass of the feed material has a particle size of less than 1 mm.

4. The method defined in claim 1 wherein the amount of moisture in the feed material is less than 20 wt. % of the total mass of the feed material.

5. The method defined in claim 1 further comprising controlling the gas product composition by controlling the temperature profile in the reactor and therefore the residence time within a required temperature range.

6. The method defined in claim 1 further comprising maintaining a required temperature profile in the reaction chamber by supplying an oxygen-containing gas to the reaction chamber and at least partially combusting combustible gases in the reaction chamber.

7. The method defined in claim 1 further comprising establishing a temperature profile in the reaction chamber that includes the following zones extending successively along the length of the reaction chamber from the upstream end to the downstream end of the reaction chamber:
   (a) a drying zone for drying the feed material to form a dried feed material,
   (b) a pre-heating zone for heating the dried feed material to form a dried and heated feed material, and
   (c) a thermo-chemical reaction zone for thermally decomposing the dried and heated feed material and producing the solid carbon-containing product and gas.

8. The method defined in claim 1 further comprising supplying an oxygen-containing gas to the reaction chamber.

9. The method defined in claim 2, wherein the feed material is less than 20 mm in size.

10. The method defined in claim 3, wherein less than 10 wt. % of the total mass of the feed material has a particle size of less than 1 mm.

11. The method defined in claim 4 wherein the amount of moisture in the feed material is less than 15 wt. % of the total mass of the feed material.

12. The method defined in claim 6, wherein the oxygen-containing gas is air.

13. The method defined in claim 7, wherein the drying zone includes an end proximate the inlet having a temperature between 60-80° C. and wherein the upper temperature limit within the drying zone is between 100-150° C.

14. The method defined in claim 7, wherein the upper temperature limit of the drying zone is between 100-150° C.

15. The method defined in claim 1, wherein the solid-containing product comprises char.

16. The method defined in claim 8, wherein the oxygen-containing gas is air.

* * * * *